ELECTRICAL CONNECTOR ASSEMBLY AND MOUNTING MEANS THEREFOR

Original Filed May 16, 1967 4 Sheets-Sheet 1

ELECTRICAL CONNECTOR ASSEMBLY AND MOUNTING MEANS THEREFOR

Original Filed May 16, 1967 4 Sheets-Sheet 2

ELECTRICAL CONNECTOR ASSEMBLY AND MOUNTING MEANS THEREFOR

Original Filed May 16, 1967 4 Sheets-Sheet 3

ELECTRICAL CONNECTOR ASSEMBLY AND MOUNTING MEANS THEREFOR

Original Filed May 16, 1967 4 Sheets-Sheet 4

United States Patent Office

Re. 27,429
Reissued July 11, 1972

27,429

ELECTRICAL CONNECTOR ASSEMBLY AND MOUNTING MEANS THEREFOR

Hermanus Petrus Johannes Gilissen, Vlijmen, Netherlands, assignor to AMP Incorporated, Harrisburg, Pa.

Original No. 3,437,983, dated Apr. 8, 1969, Ser. No. 638,802, May 16, 1967. Application for reissue Mar. 9, 1970, Ser. No. 17,990
Claims priority, application Netherlands, May 20, 1966, 6606948; July 26, 1966, 6610496
Int. Cl. H01r *11/22*
U.S. Cl. 339—198 11 Claims

Matter enclosed in heavy brackets [ ] appears in the original patent but forms no part of this reissue specification; matter printed in italics indicates the additions made by reissue.

ABSTRACT OF THE DISCLOSURE

A connector having an insulating housing provided with a passageway in which an electrical contact is disposed. The passageway is provided with camming projections that cooperates with curved portions of the electrical contact so that extraction force on a contact member disposed in electrical engagement with the electrical contact is increased by movement of the curved portions of the electrical contact in engagement with the camming projections. The insulating housing is provided with means for releasably mounting the housing in a support rail.

The present invention relates to an electrical connector assembly adapted to receive a wire or wire pin and establish a solderless or weldless electrical connection between the wire or pin and an electrical contact.

A form of connector assembly for wires or pins comprises an insulating housing having an open-ended cavity to one wall of which is rigidly secured one end of an electrical contact arranged to extend transversely of the cavity towards the opposite wall. A wire or wire pin is secured in the cavity by passing the wire or pin between the free end of the contact and the adjacent cavity wall, the contact being sufficiently resilient to permit the wire or pin to pass. The wire or pin is held against extraction from the cavity by the resilience of the contact urging the wire or pin against the cavity wall.

To ensure a good electrical connection between the wire or pin and the contact and to ensure maximum resistance to withdrawal of the wire or pin from the cavity, the contact is made stiffly resilient so that a high contact force is applied to the wire or pin. However, a high contact force means that a high force will have to be applied to the wire or pin to insert it into the cavity and this is a disadvantage.

An object of the invention is to provide an electrical connector having camming means in a passageway of housing means and on an electrical contact in the passageway to cam the electrical contact into tighter engagement with a contact element in electrical engagement with the electrical contact upon movement of the electrical contact toward the entrance of the passageway.

Another object of the invention is the provision of camming the electrical contacts in the passageways of the housing means.

A further object of the invention is to provide means for releasably mounting the housing in a supporting rail.

Other objects and attainments of the present invention will become apparent to those skilled in the art upon a reading of the following detailed description when taken in conjunction with the drawings in which there are shown and described illustrative embodiments of the invention;

it is to be understood, however, that these embodiments are not intended to be exhaustive nor limiting of the invention but are given for purposes of illustration in order that others skilled in the art may fully understand the invention and the principles thereof and the manner of applying it in practical use to that they may modify it in various forms, each as may be best suited to the conditions of a particular use.

According to the present invention an electrical connector assembly comprises an insulating block formed with a cavity opening into a face thereof, an electrical contact element having a part extending towards the cavity opening retained in the cavity but novable therein towards and away from the cavity opening and a camming projection on a wall of the cavity to engage the contact part on movement of the contact towards the cavity opening and urge the contact part towards the opposite wall of the cavity.

Embodiments of the invention are now described by way of example, reference being made to the accompanying drawings in which.

Figure 1:
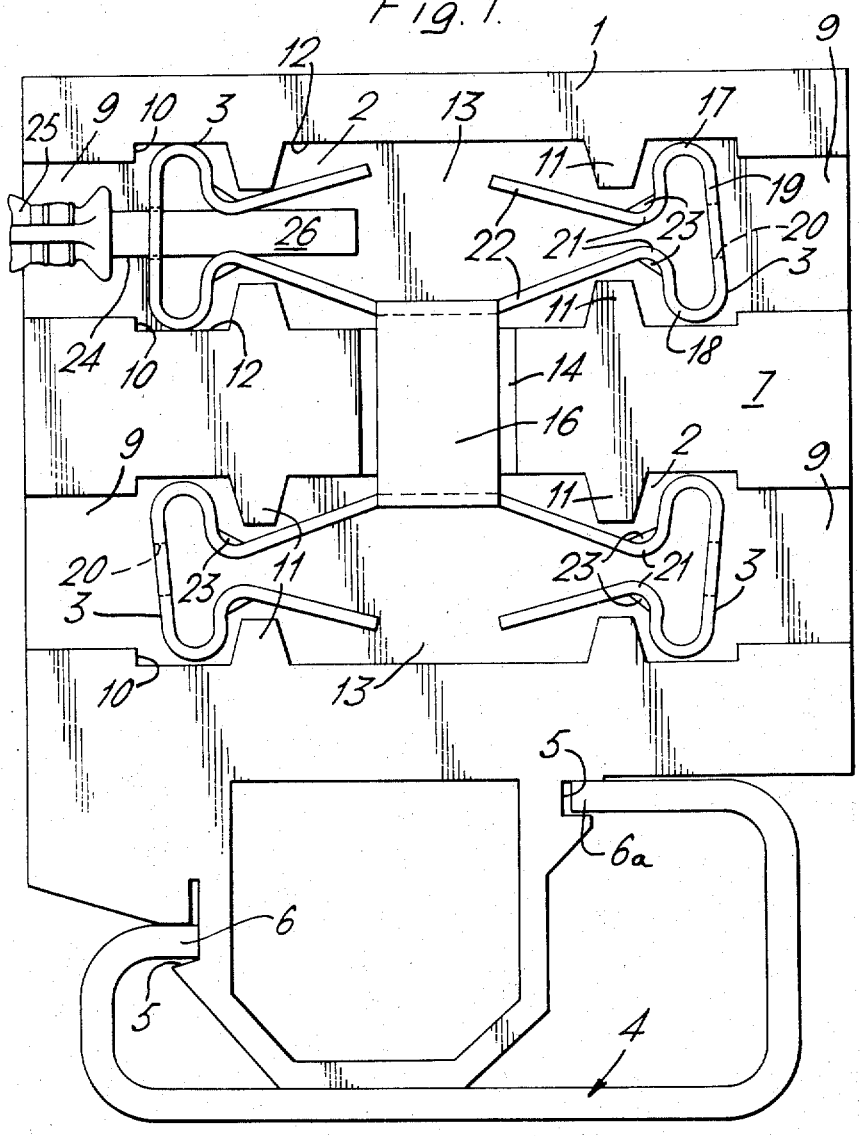
FIGURE 1 is an end elevational view of an embodiment of a connector assembly according to the invention.
Figure 2:
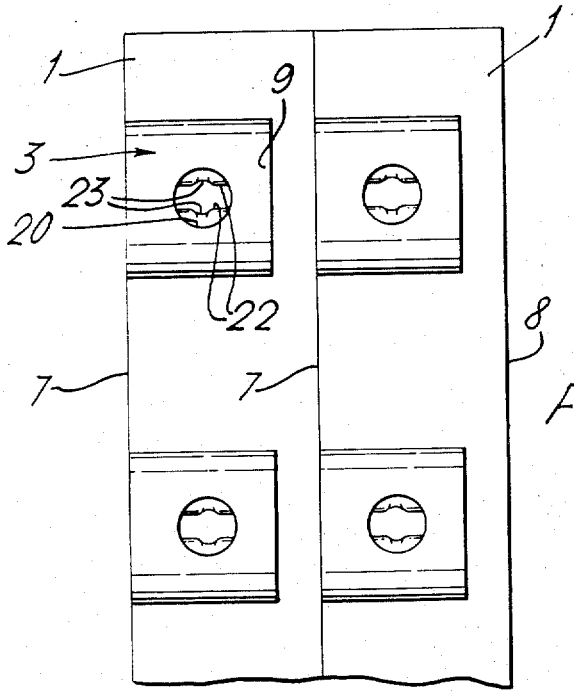
FIGURE 2 is a side elevational view of part of the connector assembly of FIGURE 1.

An electrical connector assembly as shown in FIGURES 1 and 2 includes a block 1 of electrically insulating material formed with cavities 2 in which electrical contact elements 3 are located. Two blocks 1 are shown (see FIGURE 2) secured side-by-side in a channel-shaped mounting rail 4 by means of slots 5 which receive inwardly turned ends 6, 6a of the rail 4 in snap-in engagement, this will be described in greater detail hereinafter. The blocks 1 have an open side 7 and a closed side 8, the closed side 8 of one block 1 covering the open side 7 of the adjacent block 1.

An opening 9 extends from a face of the block 1 into each cavity 2, where a shoulder 10 is formed. Camming projections 11 extend inwardly of the cavity from opposite walls 12. The cavities 2 are arranged in two parallel end-to-end pairs, the cavities 2 of each pair being in communication through a channel 13 and each pair of cavities 2 being in communication through a channel 14 connecting the channels 13.

An electrical contact element 3 formed from a resilient metal strip is located in each cavity 2. The contact element 3 is of generally U-shape, comprising a pair or arms 17, 18 joined by an integral web 19 in which an aperture 20 is formed. The arms, 17, 18 each have a curved portion 21, the curved portions 21 being directed inwardly toward each other and free end portions 22. A longitudinally extending depression 23 is formed in each arm 17, 18 at the curved portion 21, the open sides of the depressions 23 facing each other to define a guideway. The depressions 23 also act to increase the rigidity of the arms 17, 18 adjacent the curved portions 21.

The contact elements 3 are inserted in their respective cavities 2 through the open side 7 of the block 1 and are located so that the projections 12 extend into the curved portions 21 of the arms 17, 18. The contact elements 3 are free to move towards and away from the openings 9 ut are restrained from passing through them by engagement of the webs 19 with the shoulders 10. A connector rip 16, secured to the arm 18 of each of the four contact elements 3, is seated in the channel 14.

In use a wire pin 24 having a ferrule portion 25 rimped to the bared end of an electric wire (not shown) nd a contact portion 26 is inserted into the cavity 2 rough the opening 9. The contact portion 26 passes rough the aperture 20 in the web 19 of the contact ement 3 and between the curved portions 21, the dessions 23 guiding and keeping the contact portion 26 entrally between the arms 17, 18. The resilience of the aterial of the arms 17, 18 holds the curved portions 1 firmly in contact with the contact portion 26 to establish good electrical contact. On attempting to withdraw e pin 24 from the cavity 2, the contact element 3 moves long the cavity 2 with the pin 24 towards the opening bringing the free end portions 22 of the arms 17, 18 to engagement with their associated camming projections 11. Further withdrawal movement of the pin 24 auses the arms 17, 18 to be moved towards each other s they move past the projections thus increasing the contact force of the arms 17, 18 on the contact portions 6. On moving the pin 24 back into the cavity 2 the ontact force applied by the arms 17, 18 returns to the ormal resiliently applied force. It will be seen that the xtraction force, that is the force required to remove the in 24 from the contact element 3, is increased without here being a corresponding increase in the insertion force.

Figure 3:
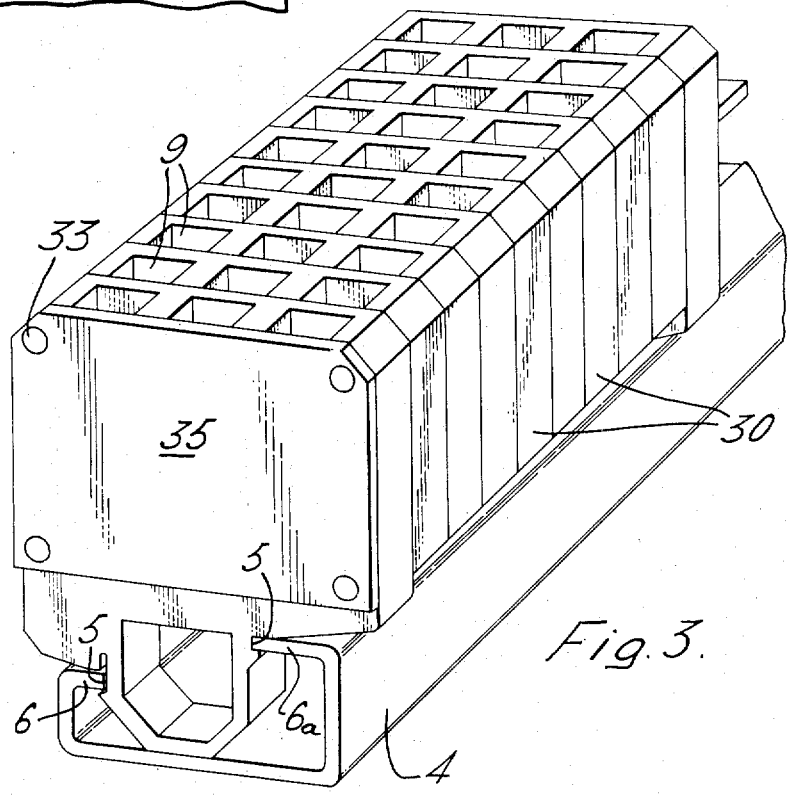
FIGURE 3 is a perspective view of another embodiment of a connector assembly according to the invention.
Figure 4:
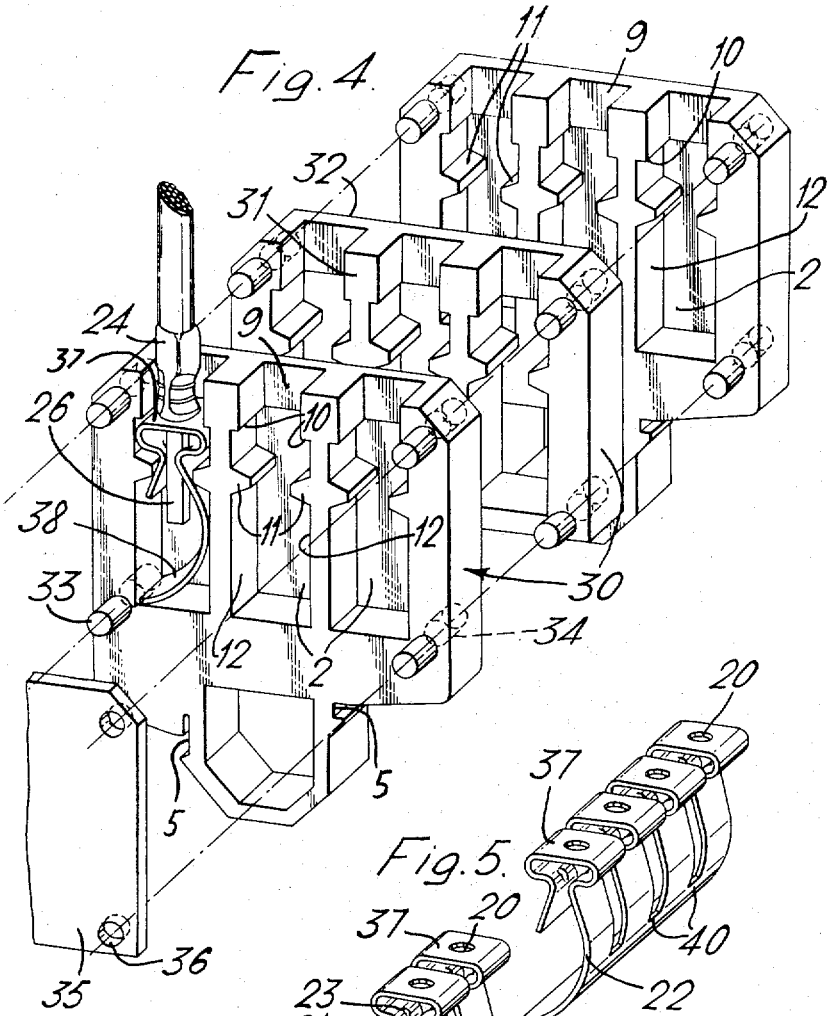
FIGURE 4 is an exploded perspective view of the assembly of FIGURE 3.
Figure 5:
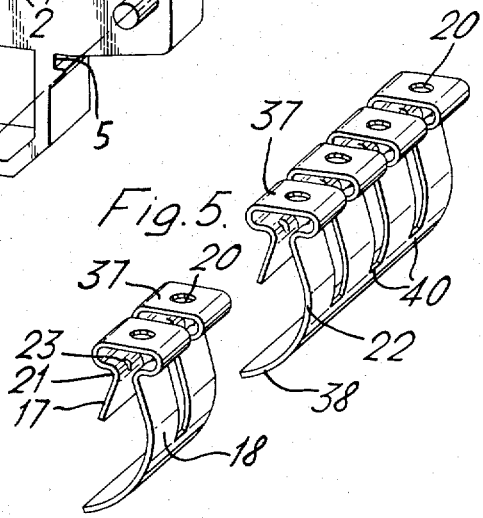
FIGURE 5 is a perspective view of contact elements of the assembly of FIGURES 3 and 4.

FIGURES 3 to 5 show another embodiment of the intention, the same reference numerals being used to indicate parts corresponding to those of the previously described embodiment.

Blocks 30 of electrically insulating material open on oth sides 31, 32 have pins 33 on side 31 and complementary recesses 34 in the side 32 to enable the blocks 0 to be secured together to form a unit as shown in IGURE 3. The pins 33 and recesses 34 may be arranged so that they polarize the blocks 30 with respect to ach other. A cover plate 35 having apertures 36 to eceive the pins 33 closes the open side of one end of block 0 and a similar cover plate (not shown) having pins o fit in the recesses 34 closes the open end of the other nd block 30.

Each block has three parallel arranged cavities 2 each ommunicating by means of an opening 9 with one face f the block 30. The cavities 2 are each formed with houlders 10 and projections 11 on opposite walls 12.

A contact element 37 for the cavities 2 of the blocks 0 is substantially the same as the contact element 2 ut has a curved extension 38 forming a continuation of he free end portion 22 of one of the arms 17, 18. On insertion of the contact element 37 into a cavity 2 the xtension 38 engages the adjacent wall 12 of the cavity tangentially and extends to meet the opposite wall 12 t the junction of the wall 12 with an end wall 19 of the avity 2.

The extension 38 acts to urge the contact element 37 owards the opening 9 bringing the arms 17, 18 into ngagement with the camming projections 11 which urge he arms 17, 18 towards each other thereby increasing he contact force on a wire or wire pin 24 inserted beween the arms 17, 18.

The contact elements 37 are joined together by webs 0 to form a strip of contact elements as shown in FIGURE 5.

To produce a unit such as that shown in FIGURE , three strips of contact elements 37 are taken and an nd contact element 37 of each strip is inserted into a elected cavity 2 of a block 30. Further blocks 30 with avities 2 thereof in communication are then successively assed along the strips until each contact element 37 is ocated in the selected cavity 2 of an appropriate block, he blocks 30 being secured together by engaging the pins 33 of one block in the recesses 34 of the adjacent block.

When the required number of blocks 30 have been joined together the open sides of the end blocks are covered by the cover plates 34.

The procedure for inserting wire pins 24 into the cavities 2 and the reaction of the contact elements 3 on subsequently attempting to withdraw the pins is as described in connection with the embodiment of FIGURES 1 and 2.

The contact elements 37 forming any one row need not all be connected by webs 40, the row may be made up from two or more individual strips. To prevent the adjacent ends of two strips forming a row from coming into contact with each other, a block 30 having a side closed over at least the extent of the appropriate cavity is used as the succeeding block. In the event that all three rows of strips are to terminate in the three cavities of a single block 30 then the succeeding block 30 is formed with a closed side to cover all three cavities of the preceding block 30. A block 30 having a closed side may be used to form the first block of a unit.

All the blocks 30 may have slots 5 to reecive the ends 6 of a mounting rail 4, or, as shown in FIGURE 4, the slots 5 may be omitted from some of the blocks 30, the blocks 30 without slots 5 being held to the rail 4 by engagement with blocks 30 with slots.

Figure 6:
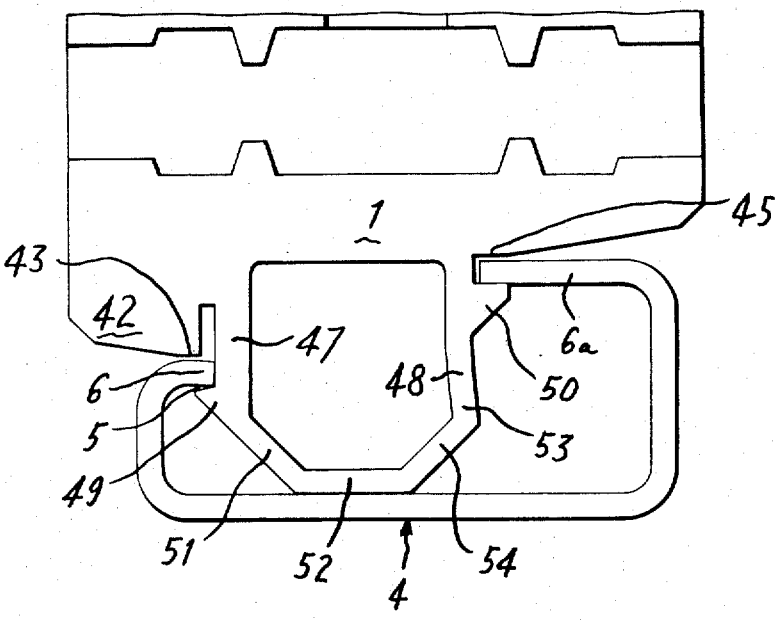
FIGURE 6 is an end view of a partial connector assembly mounted in a support rail.
Figure 7:
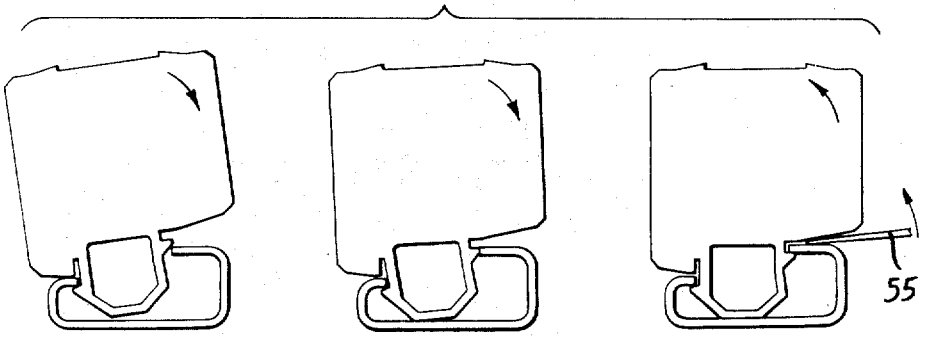
FIGURE 7 illustrates successive views of insertion of the connector block into the rail.

Turning now to FIGURES 6 and 7 which illustrate in detail the mounting concept and block 1 of FIGURES 1 and 2 will be relied on for purposes of illustration. A lower edge of the block is stepped by a downward projection 42 presenting a shoulder 43 arranged to engage a lower end 6 of the channel 4 while an upper shoulder 45 of the block engages the upper end 6a of the channel.

A pair of legs 47, 48 project downwardly from the block 1 spaced apart by the width of the open mouth of the channel. One leg 47 is adjacent the projection 42 and a short slot 5 extends between the shoulder 43 and leg 47 to increase the effective length of the leg 47.

Lower surfaces of the block 1 are tapered upwardly and outwardly from shoulders 43 and 45 to provide access to the edges of the rail for a lever for removing the blocks.

The legs 47 and 48 are provided on their remote sides with detents 49, 50 positioned to engage ends 6, 6a of the channel between them and the associated shoulders 43, 45, lower sides of the detents 49, 50 tapering downwards and inwards to facilitate insertion into the channel by camming action.

The leg 47, below detent 49 is inclined downwards and inwards at 51 to the base of the channel where it is integrally joined to strut 52 which registers against the channel base.

The leg 48 extends downwardly from the detent 50 in slightly outwardly inclined manner at 53 and opposite detent 49 is inclined inwards at 54 towards the channel base where it is integrally joined to the strut 52.

The strut 52 and legs 47, 48 are so dimensioned relative to the channel that in the position shown, the relaxed position of the strut 52 would be lower than the channel base and to this end the relaxed dimension between the shoulder of detent 49 and the adjacent end of the strut 52 in the direction of the channel depth is larger than the space between end 6 and the channel base.

During insertion as shown in FIGURE 7, the detent 49 is hooked under end 6 and the block 1 is rotated about the end 6 clockwise to engage strut 52 against base of the channel. Further movement flexes leg portion 51 and simultaneously a camming action of end 6a on the lower side of detent 50 moves the block leftwards to deflect leg portion 48.

As soon as detent 50 clears end 6a, it is driven outwards by relaxation of leg 48 which also drives the strut firmly against the channel base.

Thus, in operation the legs are deflected towards each other, between the strut and the block, to permit passage of the detents past edges of the opening to the rail section until the strut abuts the base of the rail section, which serves to straighten the strut and urge the detents outwards. Once the detents have penetrated below edges of the rail they snap outwards under the resilient action of the legs which is substantially stiffened by the action of the strut. As a result the detents enage tightly beneath edges of the channel section securely to hold the block in the rail.

It is found that substantially improved stability in the mounting is achieved.

To remove a block and overcome the retention forces, a lever 55 to the right in FIGURE 7, such as a screwdriver blade, is inserted below shoulder 45 and rotated counterclockwise to effect deflection of legs 47 and 48 towards each other to clear one of the detents with its shoulder from the edge of the rail.

It will, therefore, be appreciated that the aforementioned and other desirable objects have been achieved; however, it should be emphasized that the particular embodiments of the invention, which are shown and described herein, are intended as merely illustrative and not as restrictive of the invention.

What we claim is:

1. An electrical connector assembly comprising an insulating block having a cavity opening into a face thereof, an electrical contact element having a part extending towards the cavity opening, means on the contact element and in said opening retaining said contact element in the cavity but movable therein towards and away from the cavity opening, and camming projection means on wall means of the cavity to engage the contact element on movement of the contact element towards the cavity opening and urge the contact element towards the opposite wall of the cavity.

2. An assembly according to claim 1, in which the electrical contact element includes two contact parts each arranged adjacent a wall of the wall means, each wall having said camming projection means to urge its associated contact part towards the other contact part.

3. An assembly according to claim 1, in which the contact element is of generally U-shape comprising a pair of arms integrally connected by an apertured web, the arms curving towards each other intermediate their ends.

4. An assembly according to claim 3, in which a longitudinally extending depression is formed in the curved portion of each arm, the open sides of the depressions facing each other.

5. An assembly according to claim 2, in which one of the contact parts includes a curved extension engaging opposite walls of the cavity.

6. An assembly according to claim 1, in which a plurality of blocks are secured together, each block having a cavity with an open side and a closed side and securing means whereby the blocks are secured side-by-side with the closed side of one block covering the open side of the adjacent block.

7. An assembly according to claim 6, in which the cavities are open on both sides.

8. An electrical connector comprising a dielectric block having a passageway therein, said passageway having an entrance and opposing walls, a camming projection spaced inwardly from said entrance and extending outwardly from at least one of said walls, an electric contact element in said passageway, said contact element having a contact-engaging section for engaging a contact member therein and cam-engaging means adjacent said contact-engaging section, securing means in said passageway and on said contact element securing said contact element in said passageway and providing limited movement along said passageway, said contact element, when said contact member is disposed in said contact-engaging section, being moved along said passageway toward said entrance by said contact member thereby causing said cam-engaging means to engage said camming projection thereby increasing the pull-out force of said contact-engaging section on said contact member.

9. An insulating block having a pair of resilient legs formed with detents beyond which the legs extend, the legs being joined at their ends remote from the block by a strut, each detent engaging a projecting portion of a channel-shaped support rail the base of which is engaged by the strut, the relaxed lengths of the legs being such that the detents are urged against the projections and the strut against the base by virtue of the resilient action of the legs.

10. An assembly comprising an insulating block and a channel-shaped support rail, the block having a pair of resilient legs formed with detents beyond which the legs extend, the legs being joined at their ends remote from the block by a strut, the support rail having a pair of projections extending from sidewalls of said rail and overhanging a base of said rail, the block and the support rail being so relatively dimensioned that the legs can be inserted into the support rail so that the strut engages the base and each detent engages one of the projections to lock the block to the support rail, the legs being so dimensioned relative to the spacing between the projections and the base that when the block is locked to the support rail the legs are under compression between the projections and the base.

11. A connector assembly comprising a terminal block and a mounting member, said terminal block having spaced stiffly-flexible leg members extending outwardly from one side, strut means connecting said leg members together, detent means on each of said leg members and spaced from the one side defining spaces, said mounting member having a base, sides and inwardly-directed ends, said inwardly-directed ends being disposed in respective ones of said spaces via flexures of said stiffly-flexible leg members with said strut means being disposed in engagement with said base thereby maintaining said block in said mounting member.

References Cited

The following references, cited by the Examiner, are of record in the patented file of this patent or the original patent.

UNITED STATES PATENTS

| | | | |
|---|---|---|---|
| 2,780,791 | 2/1957 | Morschel | 339—198 |

FOREIGN PATENTS

| | | | |
|---|---|---|---|
| 347,867 | 9/1960 | Switzerland | 339—198 |
| 554,853 | 1/1957 | Italy | 339—198 |
| 850,326 | 7/1949 | Germany | 339—198 |

MARVIN A. CHAMPION, Primary Examiner

R. A. HAFER, Assistant Examiner

U.S. Cl. X.R.

339—252, 273